US012374096B2

(12) United States Patent
Wasnik et al.

(10) Patent No.: US 12,374,096 B2
(45) Date of Patent: Jul. 29, 2025

(54) TEACHING STUDENT NETWORK FOR END-TO-END SEMI-SUPERVISED OBJECT DETECTION

(71) Applicant: SONY GROUP CORPORATION, Tokyo (JP)

(72) Inventors: Pankaj Wasnik, Bangalore (IN); Naoyuki Onoe, Bangalore (IN); Vishal Chudasama, Bangalore (IN); Purbayan Kar, Bangalore (IN)

(73) Assignee: SONY GROUP CORPORATION, Tokyo (JP)

( * ) Notice: Subject to any disclaimer, the term of this patent is extended or adjusted under 35 U.S.C. 154(b) by 381 days.

(21) Appl. No.: 18/159,492

(22) Filed: Jan. 25, 2023

(65) Prior Publication Data
US 2023/0281980 A1    Sep. 7, 2023

Related U.S. Application Data

(60) Provisional application No. 63/268,863, filed on Mar. 4, 2022.

(51) Int. Cl.
*G06V 10/82*    (2022.01)
*G06N 3/045*    (2023.01)
(Continued)

(52) U.S. Cl.
CPC ............. *G06V 10/82* (2022.01); *G06N 3/045* (2023.01); *G06N 3/0895* (2023.01); *G06V 10/771* (2022.01)

(58) Field of Classification Search
CPC ...... G06N 3/045; G06N 3/0895; G06N 3/096; G06V 10/25; G06V 10/764; G06V 10/771; G06V 10/82
See application file for complete search history.

(56) References Cited

U.S. PATENT DOCUMENTS

| 2013/0129199 | A1* | 5/2013 | Russakovsky | G06V 10/774 382/159 |
| 2015/0121183 | A1* | 4/2015 | Saund | G06F 40/103 715/205 |

(Continued)

FOREIGN PATENT DOCUMENTS

| CN | 112232416 A | 1/2021 |
| CN | 113239924 A | 8/2021 |

(Continued)

OTHER PUBLICATIONS

Kihyuk Sohn et al.,"A Simple Semi-Supervised Learning Framework for Object Detection," Dec. 3, 2020, arXiv:2005.04757v2,Computer Vision and Pattern Recognition,pp. 1-8.*

(Continued)

*Primary Examiner* — Omar S Ismail
(74) *Attorney, Agent, or Firm* — CHIP LAW GROUP

(57) ABSTRACT

A system and method for end-to-end semi-supervised object detection is provided. The system retrieves labeled and unlabeled images from an image dataset and generates an input batch by application of image transformation(s) on the images. The system further generates a first result for each image of the input batch by application of a teacher neural network on the input batch. For an object in an unlabeled image of the batch, the first result includes candidate bounding boxes and scores for the boxes. The system determines a threshold score based on the scores and selects a foreground bounding box from the candidates. The system generates a second result by application of a student neural network on the unlabeled image and computes a training loss over the input batch based on the foreground bounding box and the second result. The system trains the student neural network based on the training loss.

20 Claims, 4 Drawing Sheets

(51) Int. Cl.
   *G06N 3/0895* (2023.01)
   *G06V 10/771* (2022.01)

(56) References Cited

U.S. PATENT DOCUMENTS

| | | | | |
|---|---|---|---|---|
| 2016/0358337 | A1* | 12/2016 | Dai | G06T 7/11 |
| 2019/0130191 | A1* | 5/2019 | Zhou | G06V 20/52 |
| 2019/0130580 | A1* | 5/2019 | Chen | G06V 10/82 |
| 2020/0034983 | A1* | 1/2020 | Finkelstein | G06T 7/60 |
| 2020/0184233 | A1* | 6/2020 | Berberian | G06V 20/588 |
| 2021/0056708 | A1* | 2/2021 | Li | G06T 7/11 |
| 2021/0209785 | A1* | 7/2021 | Unnikrishnan | G01S 13/931 |
| 2021/0319266 | A1* | 10/2021 | Chen | G06F 18/2155 |
| 2021/0365707 | A1* | 11/2021 | Mao | G06V 20/46 |
| 2021/0383134 | A1* | 12/2021 | Ko | G06V 10/22 |
| 2022/0164961 | A1* | 5/2022 | Lee | G06T 7/194 |
| 2022/0207875 | A1* | 6/2022 | Kopparapu | G06N 20/00 |
| 2022/0343178 | A1* | 10/2022 | Hall | G06N 3/08 |

FOREIGN PATENT DOCUMENTS

| | | |
|---|---|---|
| WO | 2020/198779 A1 | 10/2020 |
| WO | 2022/042002 A1 | 3/2022 |

OTHER PUBLICATIONS

Bo Xiao et al.,"A semi-supervised learning detection method for vision-based monitoring of construction sites by integrating teacher-student networks and data augmentation," Aug. 11, 2021, Advanced Engineering Informatics 50 (2021) 101372,pp. 1-10.*

Yu-Jhe Li et al.,"Cross-Domain Adaptive Teacher for Object Detection," Jun. 2022, Proceedings of the IEEE/CVF Conference on Computer Vision and Pattern Recognition (CVPR), 2022, pp. 7581-7588.*

Hongyu Zhou et al.,"Dense Teacher: Dense Pseudo-Labels for Semi-supervised Object Detection," Nov. 6, 2022,Computer Vision—ECCV 2022. ECCV 2022. Lecture Notes in Computer Science, vol 13669. Springer, Cham., pp. 35-45.*

Mengde Xu et al.,"End-to-End Semi-Supervised Object Detection with Soft Teacher," Oct. 2021, Proceedings of the IEEE/CVF International Conference on Computer Vision (ICCV), 2021,pp. 3060-3066.*

Wenming Cao et al.,"Fast Deep Neural Networks With Knowledge Guided Training and Predicted Regions of Interests for Real-Time Video Object Detection," Mar. 13, 2018,IEEE Access , vol. 6,2018, pp. 8990-8997.*

Yihe Tang et al.,"Humble Teachers Teach Better Students for Semi-Supervised Object Detection," Jun. 2021,Proceedings of the IEEE/CVF Conference on Computer Vision and Pattern Recognition (CVPR), 2021, pp. 3132-3138.*

Gang Li et al.,"PseCo: Pseudo Labeling and Consistency Training for Semi-Supervised Object Detection," Nov. 6, 2022, Computer Vision—ECCV 2022. ECCV 2022. Lecture Notes in Computer Science, vol 13669. Springer, Cham., pp. 458-469.*

Hengduo Li et al.,"Rethinking Pseudo Labels for Semi-supervised Object Detection," Jun. 28, 2022, The Thirty-Sixth AAAI Conference on Artificial Intelligence (AAAI-22), pp. 1314-1319.*

Yen-Cheng Liu et al.,"Unbiased Teacher for Semi-Supervised Object Detection," Feb. 18, 2021,Published as a conference paper at ICLR 2021,pp. 1-5.*

Chetan L. Srinidhi et al.,"Self-supervised driven consistency training for annotation efficient histopathology image analysis," Oct. 13, 2021, Medical Image Analysis 75 (2022) 102256,pp. 1-10.*

Chetan L Srinidhi, et al, "Self-supervised driven consistency training for annotation efficient histopathology image analysis", arxiv. org, Cornell University Library, 201 Olin Library Cornell University Ithaca, NY 14853, Oct. 3, 2021 (Oct. 3, 2021), XP091065678, pp. 1-24.

Kihyuk Sohn, et al, "A Simple Semi-Supervised Learning Framework for Object Detection", arxiv.org, Cornell University Library, 201 Olin Library Cornell University Ithaca, NY 14853, May 10, 2020 (May 10, 2020), XP081666838, pp. 1-23.

Hengduo Li , et al: "Rethinking Pseudo Labels for Semi-supervised Object Detection", Proceedings of the AAAI Conference on Artificial Intelligence, vol. 36, No. 2, Dec. 30, 2021 (Dec. 30, 2021), pp. 1314-1322, XP93045124, ISSN: 2159-5399, DOI: 10.1609/aaai. v36i2.20019.

Mengde Xu, et al, "End-to-End Semi-Supervised Object Detection with Soft Teacher", arxiv.org, Cornell University Library, 201 Olin Library Cornell University Ithaca, NY 14853, Aug. 6, 2021 (Aug. 6, 2021), XP091027027, pp. 1-10.

* cited by examiner

TEACHING STUDENT NETWORK FOR END-TO-END SEMI-SUPERVISED OBJECT DETECTION

CROSS-REFERENCE TO RELATED APPLICATIONS/INCORPORATION BY REFERENCE

This application claims priority to U.S. Provisional Patent Application Ser. No. 63/268,863 filed on Mar. 4, 2022, the entire content of which is hereby incorporated herein by reference.

FIELD

Various embodiments of the disclosure relate to neural networks and object detection. More specifically, various embodiments of the disclosure relate to a system and method for teaching student network for end-to-end semi-supervised object detection.

BACKGROUND

Advancements in the field of computer vision and artificial intelligence have led to development of various kinds of neural networks (or models) for a variety of applications, such as object detection. Typically, the goal of object detection is to identify and locate objects associated with certain class labels from still image or video data. The location of the object in the image may be indicated via a bounding box overlaid on the image. Recently, neural network models have been used for object detection. Such models are trained on a training dataset that may include multiple images associated with each object class. For example, if the neural network is to be trained for detection of an object (e.g., a dog), then the training dataset may include several images of the object along with a class label and co-ordinates of the bounding box that may be placed around the object. In many cases, the images in the dataset are manually annotated by people. For example, a person may label each image with the class label and may annotate the image with a bounding box with co-ordinates of the bounding box. In some cases, labeled image examples for a certain class can be few in number. In such cases, semi-supervised learning (SSL) is sometimes used. SSL utilizes the potential of unlabeled data to facilitate model learning when large-scale annotated datasets are unavailable. While the SSL approaches have been successfully applied for image classification and object detection tasks, complexities in the architecture design of object detectors hinder the transfer of existing semi-supervised techniques from image classification to object detection.

Limitations and disadvantages of conventional and traditional approaches will become apparent to one of skill in the art, through comparison of described systems with some aspects of the present disclosure, as set forth in the remainder of the present application and with reference to the drawings.

SUMMARY

A system and method for teaching student network for end-to-end semi-supervised object detection is provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Figure 1:
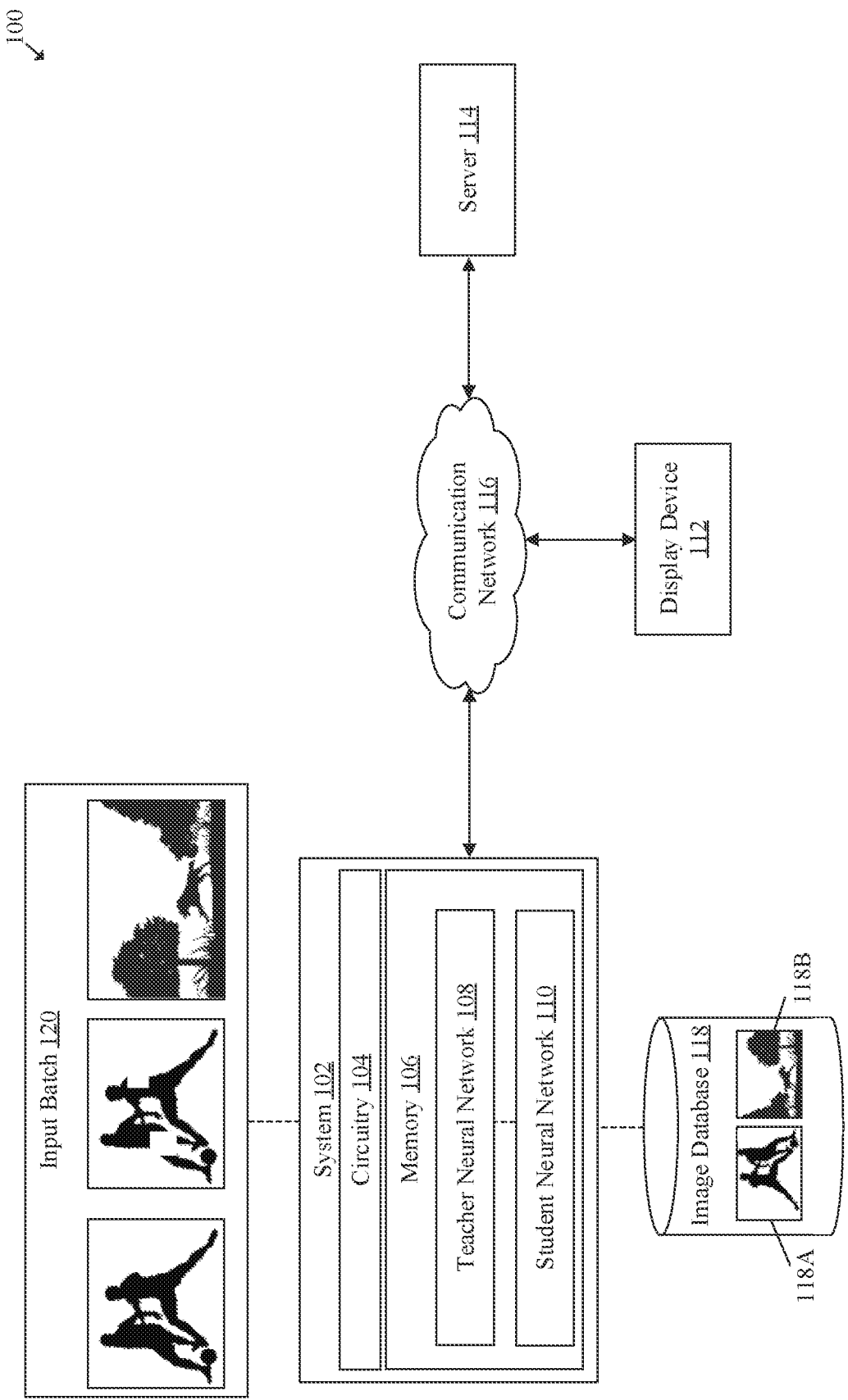
FIG. 1 is a diagram that illustrates a network environment for teaching student network for end-to-end semi-supervised object detection, in accordance with an embodiment of the disclosure.

The following described implementations may be found in a disclosed system and method for teaching student network for end-to-end semi-supervised object detection. Object detection may be defined as a task of detecting instances of objects of a certain class within an image or a video. In some cases, object detection further includes another task of generation of a bounding box around the detected object. Object detection has applications in a variety of fields such as self-driving vehicles, unmanned aerial vehicles (UAVs), mobile phones video surveillance, image retrieval systems, and the like. As an example, object detection is used in Advanced Driver Assistance Systems (ADAS) to enable vehicles to detect driving lanes or perform pedestrian detection to improve road safety.

The present disclosure provides a system that may retrieve labeled and unlabeled images from an image dataset and may generate an input batch by an application of a set of image transformations on the labeled and unlabeled images. The system may further generate a result for each image of the input batch by an application of a teacher neural network on the input batch. The teacher neural network may be a pretrained network for an object detection task and the result for an object in a first unlabeled image of the input batch may include a set of candidate bounding boxes for the object and a set of scores corresponding to the set of candidate bounding boxes. For the object, the system may determine a threshold score based on the set of scores and may select a foreground bounding box from the set of candidate bounding boxes based on the threshold score. The system may further generate a result that includes a bounding box prediction for the object, by an application of a student neural network on the first unlabeled image. The student neural network may be an untrained network that is to be trained for the object detection task. The system may compute a training loss over the input batch based on the foreground bounding box and the bounding box prediction and may re-train the student neural network on the object detection task based on the training loss.

Recently, the task of object detection is accomplished by using a neural network model (or multiple neural network models) that are pre-trained for the task of detection of a one or more objects. To train the neural network model (or multiple neural network models), a dataset must be generated that includes a plurality of training samples. Each training sample may include at least one image of each object of the one or more objects to be detected. Furthermore, each training sample may include a class label associated with the object in the corresponding image and co-ordinates of a bounding box that includes the object in the corresponding image.

To generate the dataset, a large number of example images (e.g., in thousands) of each object have to be collected. The collection is typically done manually from various sources and is a tedious task. In some cases, labeled image examples for a certain object class can be few in number. In such cases, semi-supervised learning (SSL) is sometimes used. SSL utilizes the potential of unlabeled data to facilitate model learning when large-scale annotated datasets are unavailable. While the SSL approaches have been successfully applied for image classification and object detection tasks, complexities in the architecture design of object detectors hinder the transfer of existing semi-supervised techniques from image classification to object detection.

The present disclosure provides a neural network framework that may be based on semi-supervised learning for object detection. Specifically, in semi-supervised learning unannotated (or unlabeled) data is used to facilitate model learning of a neural network with limited annotated (or labelled) data. The present disclosure may use a teacher-student framework which performs pseudo-labeling for unlabeled images and trains a detector (i.e., the student neural network) using these pseudo-labels along with a few labeled images at each iteration. The teacher-student framework includes a teacher neural network and a student neural network. The teacher neural network may be a pretrained network for an object detection task and the student neural network may be an untrained network that may have to be trained for the object detection task. The student neural network is trained for the object detection task based on a training loss computed from individual predictions of the teacher neural network and the student neural network.

The present disclosure may be used in scenarios where the number of labelled images is limited (for e.g., 1%) as compared to the amount of the unlabeled images in the dataset. Therefore, the present disclosure may drastically reduce the human effort that may be required to generate the dataset and label the images in the dataset.

The present disclosure proposes a new update mechanism that is made up of Exponential Moving Average (EMA) and Exponential Adaptive Difference Moving Average (E-ADMA) to update the teacher neural network from the student neural network during training time. Also, the disclosure provides two new loss functions for classification, called background similarity loss function and foreground-background dissimilarity loss functions that may leverage the background/foreground predictions of the teacher neural network and the student neural network and improvise the classification performance. The present disclosure may also disclose a jitter-bagging module that may be helpful in refining bounding box predictions of the neural networks. The present disclosure also proposes a new adaptive threshold mechanism to obtain optimum bounding boxes for classification and regression tasks.

FIG. 1 is a diagram that illustrates a network environment for teaching student network for end-to-end semi-supervised object detection, in accordance with an embodiment of the disclosure. With reference to FIG. 1, there is shown a diagram of a network environment 100. The network environment 100 includes a system 102. The system 102 includes circuitry 104 and a memory 106. The memory 106 may include, for example, a teacher neural network 108 and a student neural network 110. With reference to FIG. 1, there is further shown a display device 112, a server 114, and a communication network 116. As an example, there is also shown an image dataset 118 and an input batch 120.

The system 102 may include suitable logic, circuitry, and interfaces that may be configured to train the student neural network 110 for an object detection task. The object detection task may be a semi-supervised machine learning task in which the number of training examples may be few in number (e.g., less than 4-5 images) for a target object class on which the student neural network 110 needs to be trained. Examples of the system 102 may include, but are not limited to, a computing device, a mainframe machine, a server, a computer workstation, a gaming device, and/or a consumer electronic (CE) device.

The circuitry 104 may include suitable logic, circuitry, and interfaces that may be configured to execute program instructions associated with different operations to be executed by the system 102. The circuitry 104 may be implemented based on a number of processor technologies known in the art. Examples of the processor technologies may include, but are not limited to, a Central Processing Unit (CPU), an x86-based processor, a Reduced Instruction Set Computing (RISC) processor, an Application-Specific Integrated Circuit (ASIC) processor, a Complex Instruction Set Computing (CISC) processor, a Graphical Processing Unit (GPU), a co-processor (such as an inference accelerator or an Artificial Intelligence (AI) accelerator), and/or a combination thereof.

The memory 106 may include suitable logic, circuitry, and/or interfaces that may be configured to store the program instructions executable by the circuitry 104. The memory 106 may also store the teacher neural network 108 and the student neural network 110. In at least one embodiment, the memory 106 may also store the input batch 120 and intermediate or final results obtained from the teacher neural network 108 and the student neural network 110. Examples of implementation of the memory 106 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

Each the teacher neural network 108 and the student neural network 110 may be a computational network or a system of artificial neurons that may be arranged in a plurality of layers. The plurality of layers of the corresponding neural network may include an input layer, one or more hidden layers, and an output layer. Each layer of the plurality of layers may include one or more nodes (or artificial neurons). Outputs of all nodes in the input layer may be coupled to at least one node of hidden layer(s). Similarly, inputs of each hidden layer may be coupled to outputs of at least one node in other layers of the corresponding neural network. Outputs of each hidden layer may be coupled to inputs of at least one node in other layers of the corresponding neural network. Node(s) in the final layer may receive inputs from at least one hidden layer to output a result. The number of layers and the number of nodes in each layer may be determined from hyper-parameters of the corresponding neural network. Such hyper-parameters may be set before training or after training the corresponding neural network on a training dataset.

Each node of the corresponding neural network may correspond to a mathematical function (e.g., a sigmoid function or a rectified linear unit) with a set of parameters that is tunable during training of the network. The set of parameters may include, for example, a weight parameter, a regularization parameter, and the like. Each node may use the mathematical function to compute an output based on one or more inputs from nodes in other layer(s) (e.g., previous layer(s)) of the corresponding neural network. All or some of the nodes of the corresponding neural network may correspond to same or a different mathematical function.

In training of the corresponding neural network, one or more parameters of each node of the corresponding neural network may be updated based on whether an output of the final layer for a given input (from the training dataset) matches a correct result based on a loss function for the corresponding neural network. The above process may be repeated for same or a different input until a minima of loss function is achieved, and a training error is minimized. Several methods for training are known in art, for example, gradient descent, stochastic gradient descent, batch gradient descent, gradient boost, meta-heuristics, and the like.

The teacher neural network 108 may include electronic data, which may be implemented as, for example, a software component of an application executable on the system 102. The teacher neural network 108 may rely on libraries, external scripts, or other logic/instructions for execution by a processing device, such as the circuitry 104. The teacher neural network 108 may include code and routines configured to enable a computing device, such as the circuitry 104 to perform one or more operations for object detection. Additionally, or alternatively, the teacher neural network 108 may be implemented using hardware including a processor, a microprocessor (e.g., to perform or control performance of one or more operations), a field-programmable gate array (FPGA), a co-processor (e.g., an inference accelerator), or an application-specific integrated circuit (ASIC). Alternatively, in some embodiments, the neural network may be implemented using a combination of both hardware and software.

Similar to the teacher neural network 108, the student neural network 110 may include electronic data, which may be implemented as, for example, a software component of an application executable on the system 102. The student neural network 110 may rely on libraries, external scripts, or other logic/instructions for execution by a processing device, such as the circuitry 104. The student neural network 110 may include code and routines that may be configured to enable a computing device, such as the circuitry 104 to perform one or more operations for object detection. Additionally, or alternatively, the student neural network 110 may be implemented using hardware including a processor, a microprocessor (e.g., to perform or control performance of one or more operations), a field-programmable gate array (FPGA), or an application-specific integrated circuit (ASIC). Alternatively, in some embodiments, the neural network may be implemented using a combination of hardware and software.

In an embodiment, the teacher neural network 108 may be a pre-trained neural network for an object detection task. Whereas the student neural network 110 may be an untrained network that may have to be trained for the object detection task.

Examples of the teacher neural network 108 and the student neural network 110 may include, but are not limited to, a deep neural network (DNN), a convolutional neural network (CNN), Region-Based Convolutional Neural Network (R-CNN), Fast R-CNN, Faster R-CNN, an artificial neural network (ANN), (You Only Look Once) YOLO network, CNN+ANN, a fully connected neural network, and/or a combination of such networks. In certain embodiments, the teacher neural network 108 and/or the student neural network 110 may be based on a hybrid architecture of multiple Deep Neural Networks (DNNs).

The display device 112 may include suitable logic, circuitry, and interfaces that may be configured to display labeled and unlabeled images from the image dataset 118. In an embodiment, the display device 112 may be configured to display the input batch 120 that may be generated by an application of a set of image transformations on the labeled and unlabeled images. The display device 112 may be utilized to view a status of execution of operations associated with a training of the student neural network 110. The display device 112 may be realized through several known technologies such as, but not limited to, at least one of a Liquid Crystal Display (LCD) display, a Light Emitting Diode (LED) display, a plasma display, or an Organic LED (OLED) display technology, or other display devices. In accordance with an embodiment, the display device 112 may refer to a display screen of a head mounted device (HMD), a smart-glass device, a see-through display, a projection-based display, an electro-chromic display, or a transparent display.

The server 114 may include suitable logic, circuitry, and interfaces, and/or code that may be configured to store the image dataset 118. The server 114 may be configured to also store the input batch 120 and results associated with neural networks. In accordance with an embodiment, the server 114 may be implemented as a cloud server and may execute operations through web applications, cloud applications, HTTP requests, repository operations, file transfer, and the like. Other example implementations of the server 114 may include, but are not limited to, a media server, a database server, a file server, a web server, an application server, a mainframe server, or a cloud computing server.

In at least one embodiment, the server 114 may be implemented as a plurality of distributed cloud-based resources by use of several technologies that are well known to those ordinarily skilled in the art. A person with ordinary skill in the art will understand that the scope of the disclosure may not be limited to the implementation of the server 114 and the system 102 as two separate entities. In certain embodiments, the functionalities of the server 114 can be incorporated in its entirety or at least partially in the system 102, without a departure from the scope of the disclosure.

The communication network 116 may include a communication medium through which the system 102, the display device 112, and the server 114 may communicate with each other. The communication network 116 may include one of a wired connection or a wireless connection. Examples of the communication network 116 may include, but are not limited to, the Internet, a cloud network, Cellular or Wireless Mobile Network (such as Long-Term Evolution and 5G New Radio), a Wireless Fidelity (Wi-Fi) network, a Personal Area Network (PAN), a Local Area Network (LAN), or a Metropolitan Area Network (MAN). Various devices in the network environment 100 may be configured to connect to the communication network 116 in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, and Bluetooth (BT) communication protocols.

The image dataset 118 may correspond to a collection of instances of one or more objects and may include a set of labelled images 118A and a set of unlabeled images 118B. Each image in the image dataset 118 may include at least one object. The object may be an animate object or an inanimate object. The animate objects may possess a quality or features of a living being whereas in-animate objects may lack such features. Examples of animated objects may include humans, birds, animals, and the like. Examples of in-animated objects may include rocks, chairs, vehicles, and the like.

Each image of the set of labelled images 118A may be labeled (or annotated) with a name of an object included in the corresponding image. For example, if the image is of a dog, then the image may be labelled as a dog. In an embodiment, the image may be further labelled with co-ordinates of a bounding box that includes the object. Each unlabeled image 118B may not include any labels for the object(s) included in the image.

In operation, the circuitry 104 may retrieve labeled and unlabeled images from the image dataset 118. To retrieve such images, the circuitry 104 may randomly sample the image dataset 118 using a sample ratio. For example, the sample ratio may be set to 0.2 for the unlabeled images and 0.5 for labeled images.

The circuitry 104 may generate an input batch (e.g., the input batch 120) by an application of a set of image transformations on the labeled and unlabeled images. In an embodiment, the set of image transformations may include a first subset of image transformations that may be associated with a first data augmentation type (i.e., a weak data augmentation) and a second subset of image transformations that may be associated with a second data augmentation type (i.e., a strong data augmentation). The second data augmentation type may be different from the first data augmentation type. For example, the first subset of image transformations may include an image flipping operation, an image shifting operation, and the like. The second subset of image transformations may include one or more of an image rotation operation, a blur operation, a contrast variation, a shear operation, a masking operation for one or more regions of an image, a jitter addition operation, an addition of a random noise, and the like.

After the input batch 120 is generated, images from input batch 120 are fed to the teacher neural network 108 and the student neural network 110. For each image of the input batch 120, the circuitry 104 may generate a first result (i.e., a supervised or an unsupervised object detection result). The first result may be generated by an application of the teacher neural network 108 on images of the input batch 120. As discussed, the teacher neural network 108 may be a pre-trained network for the object detection task. For an object in a first unlabeled image of the input batch 120, the first result may include a set of candidate bounding boxes for the object and a set of scores corresponding to the set of candidate bounding boxes. Each score of the set of scores may correspond to a confidence score associated with the corresponding candidate bounding box. Specifically, the confidence score may indicate a likelihood of presence of the object inside a corresponding bounding box.

In accordance with an embodiment, the set of scores may include foreground scores and background scores. The foreground scores may be for foreground bounding boxes of the set of candidate bounding boxes and the background score may be for background bounding boxes of the set of candidate bounding boxes. The circuitry 104 may determine a threshold score based on the foreground scores and background scores. Details about the determination of the threshold score are provided, for example, in FIG. 3.

The selection of the threshold may be performed to adaptively filter out bounding boxes that are not part of the foreground. In an embodiment, the system 102 may be configured to apply a non-maximum suppression operation on the set of candidate bounding boxes to extract a subset of candidate bounding boxes from the set of candidate bounding boxes. The circuitry 104 may select a foreground bounding box from the subset of candidate bounding boxes based on the determined threshold score. The foreground bounding box may be selected for use as a ground truth for the student neural network 110. By the application of the student neural network 110 on the first unlabeled image, the circuitry 104 may generate a second result. The second result may include a bounding box prediction for the object. As discussed, the student neural network 110 may be an untrained network that may have to be trained for the object detection task. Based on the selected foreground bounding box and the bounding box prediction, the circuitry 104 may compute a training loss over the input batch 120. The computed training loss may include a loss component for each image of the input batch 120. Based on the training loss, the circuitry 104 may train the student neural network 110 on the object detection task. Details about the training of the student neural network 110 are provided, for example, in FIG. 3.

Figure 2:
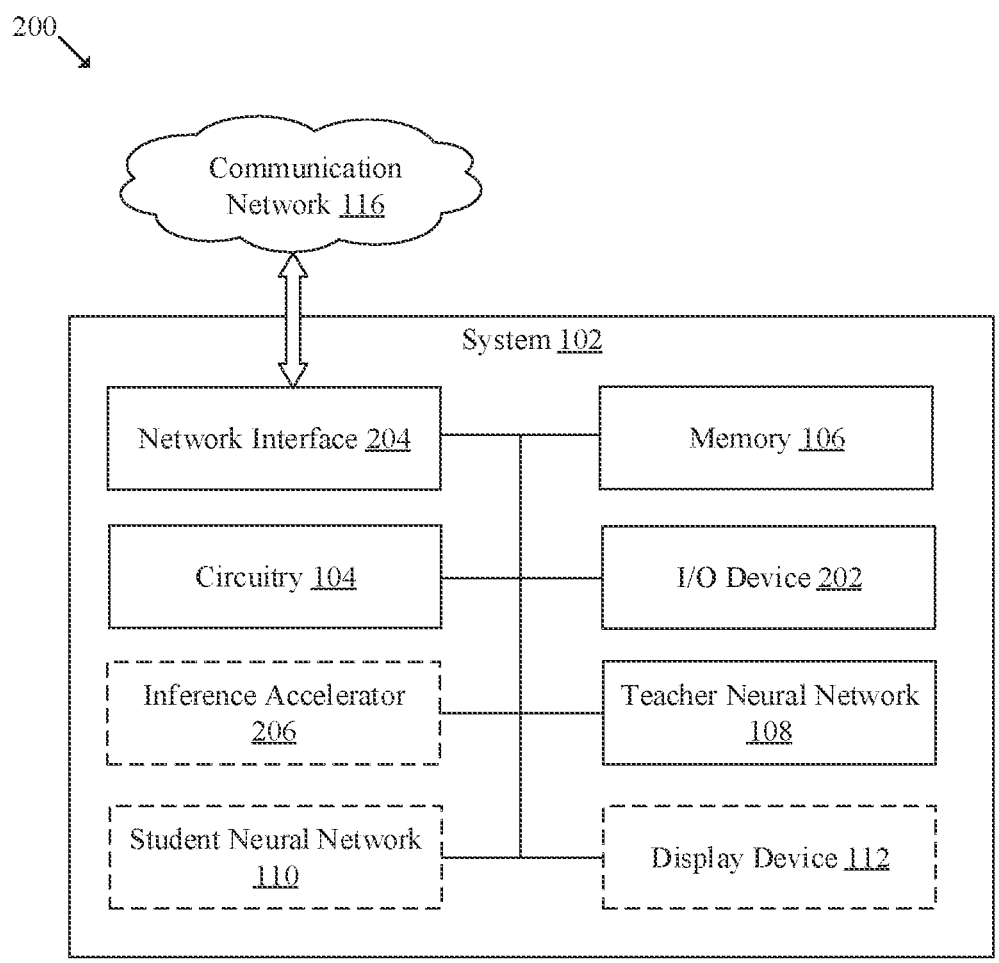
FIG. 2 is an exemplary block diagram of a system for teaching student network for an end-to-end semi-supervised object detection, in accordance with an embodiment of the disclosure.

FIG. 2 is an exemplary block diagram of a system for teaching student network for an end-to-end semi-supervised object detection, in accordance with an embodiment of the disclosure. FIG. 2 is explained in conjunction with elements from FIG. 1. With reference to FIG. 2, there is shown a block diagram 200 of the system 102 of FIG. 1. The system includes the circuitry 104, the memory 106, the teacher neural network 108, the student neural network 110, the display device 112, an input/output (I/O) device 202, a network interface 204, and an inference accelerator 206.

The I/O device 202 may include suitable logic, circuitry, and/or interfaces that may be configured to receive one or more user inputs and/or render information produced by the system 102. The I/O device 202 may include various input and output devices, which may be configured to communicate with different operational components of the system 102. Examples of the I/O device 202 may include, but are not limited to, a touch screen, a keyboard, a mouse, a joystick, a microphone, and a display device (such as the display device 112).

The network interface 204 may include suitable logic, circuitry, interfaces, and/or code that may be configured to establish communication between the system 102, the display device 112, and the server 114 via the communication network 116. The network interface 204 may be configured to implement known technologies to support wired or wireless communication. The network interface 204 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, and/or a local buffer.

The network interface 204 may be configured to communicate via offline and online wireless communication with networks, such as the Internet, an Intranet, and/or a wireless network, such as a cellular telephone network, a wireless local area network (WLAN), personal area network, and/or a metropolitan area network (MAN). The wireless communication may use any of a plurality of communication standards, protocols and technologies, such as Global System for Mobile Communications (GSM), Enhanced Data GSM Environment (EDGE), wideband code division multiple access (W-CDMA), code division multiple access (CDMA), LTE, 5G New Radio, time division multiple access (TDMA), Bluetooth, Wireless Fidelity (Wi-Fi) (such as IEEE 802.11, IEEE 802.11b, IEEE 802.11g, IEEE 802.11n, and/or any other IEEE 802.11 protocol), voice over Internet Protocol (VoIP), Wi-MAX, Internet-of-Things (IoT) technology, Machine-Type-Communication (MTC) technology, a protocol for email, instant messaging, and/or Short Message Service (SMS).

The inference accelerator 206 may include suitable logic, circuitry, interfaces, and/or code that may be configured to operate as a co-processor for the circuitry 104 to accelerate computations associated with the operations of the teacher neural network 108 and/or the student neural network 110. For instance, the inference accelerator 206 may accelerate the computations on the system 102 such that the first result and the second result is generated in less time than what is typically incurred without the use of the inference accelerator 206. The inference accelerator 206 may implement various acceleration techniques, such as parallelization of some or all the operations of the teacher neural network 108 and the student neural network 110. The inference accelerator 206 may be implemented as a software, a hardware, or a combination thereof. Example implementations of the inference accelerator 206 may include, but are not limited to, a GPU, a Tensor Processing Unit (TPU), a neuromorphic chip, a Vision Processing Unit (VPU), a field-programmable gate arrays (FGPA), a Reduced Instruction Set Computing (RISC) processor, an Application-Specific Integrated Circuit (ASIC) processor, a Complex Instruction Set Computing (CISC) processor, a microcontroller, and/or a combination thereof.

Figure 3:
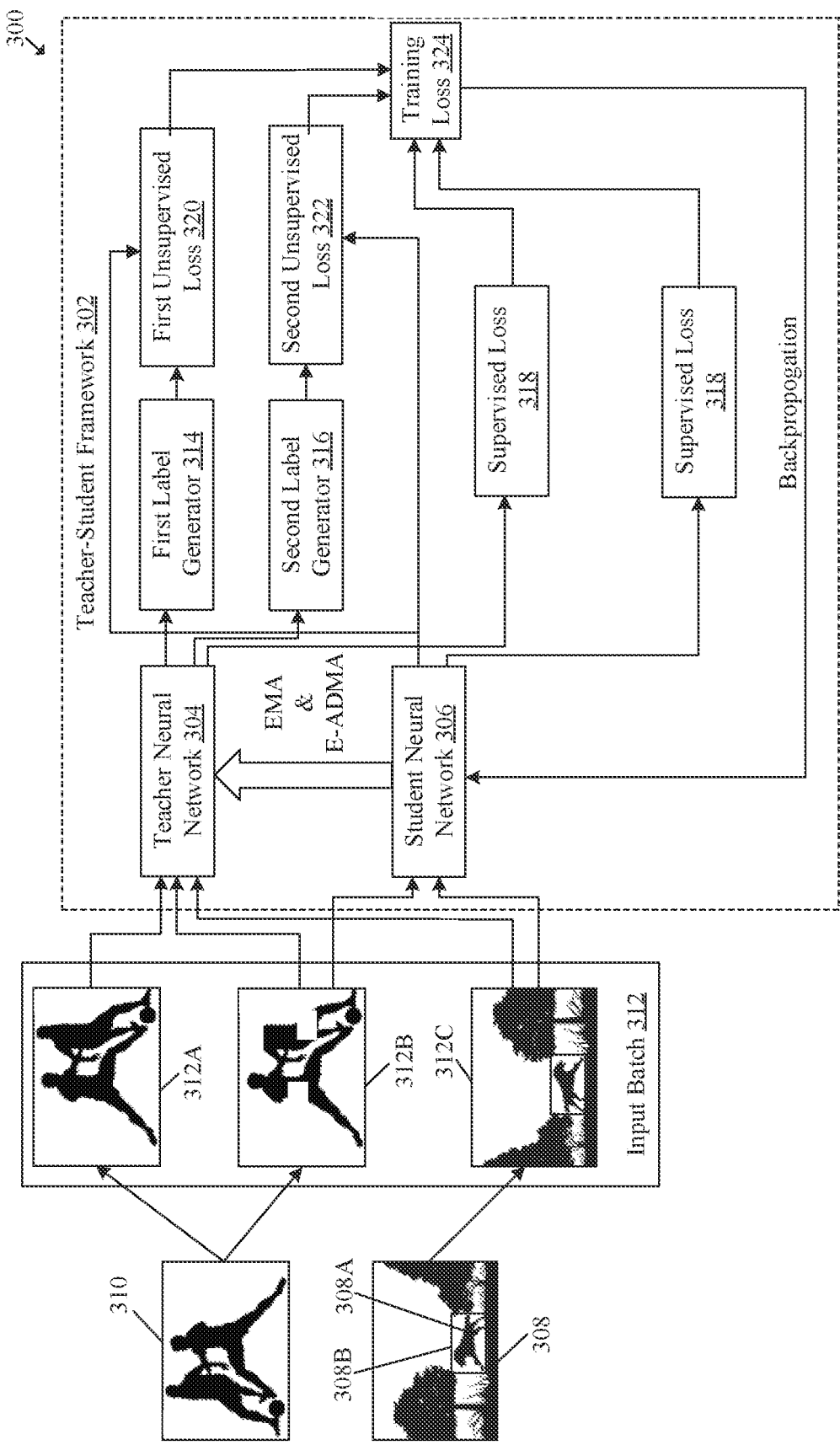
FIG. 3 is a diagram that illustrates an exemplary architecture of a teacher student framework for end-to-end semi-supervised object detection, in accordance with an embodiment of the disclosure.

FIG. 3 is a diagram that illustrates an exemplary architecture of a teacher student framework for an end-to-end semi-supervised object detection, in accordance with an embodiment of the disclosure. FIG. 3 is explained in conjunction with elements from FIG. 1 and FIG. 2. With reference to FIG. 3, there is shown a diagram 300 of a teacher-student framework 302. The teacher-student framework 302 may include a teacher neural network 304 and a student neural network 306. The teacher neural network 304 may be a pretrained network for an object detection task and the student neural network 306 may be an untrained network that may have to be trained for the object detection task. With reference to FIG. 3, there is further shown a labeled image 308 and an unlabeled image 310.

At any time-instant, the circuitry 104 may retrieve the labeled 308 and the unlabeled image 310 from the image dataset 118. The image dataset 118 may include the set of labelled images 118A and the set of unlabeled images 118B. In an embodiment, the circuitry 104 may randomly sample the image dataset 118 using a sample ratio to retrieve the labeled image 308 and the unlabeled image 310. For example, the sample ratio for the set of labeled images 118A may be 0.5 and the sample ratio for the set of unlabeled images 118B may be 0.2. As shown, for example, the labelled image 308 may is an image of an animal 308A in a forest. The labelled image 308 includes a bounding box 308B around the animal 308A. The animal 308A may correspond to an object. In an embodiment, the student neural network 110 may have to be trained for the detection of the animal 308A.

Based on the retrieval of the labeled image 308 and an unlabeled image 310 from the image dataset 118, the system 102 may generate an input batch 312. The input batch 312 may be generated by an application of a set of image transformations on the labeled image 308 as well as the unlabeled image 310. In an embodiment, the set of image transformations may include a first subset of image transformations associated with a first data augmentation type. The set of image transformations may also include a second subset of image transformations associated with a second data augmentation type. The second data augmentation type may be different from the first data augmentation type. While the first data augmentation type may refer to a weak data augmentation approach, the second data augmentation type may be referred to a strong data augmentation approach.

By way of example, and not limitation, the first subset of image transformations may include an image flipping operation and an image shifting operation. The image flipping operation may correspond to an operation to rotate an image along a horizontal or vertical axis. The image shifting operation may correspond to an operation to shift pixels of the image to a new position in the image. The second subset of image transformations may include one or more of an image rotation operation, a blur operation, a contrast variation, a shear operation, a masking operation for one or more regions of an image, a jitter addition operation, or an addition of a random noise. The image rotation operation may correspond to an operation to rotate the image by certain degrees in a clockwise or counterclockwise direction. The blur operation may correspond to addition of Gaussian blur to the image to reduce a sharpness of object(s) in the image. The contrast variation may correspond to an operation to change the contrast of the image. Similarly, the shear operation may correspond to an operation to segment the image into parts and to separate the parts by certain distance (in terms of pixel coordinates). The masking operation for one or more regions of the image may correspond to an operation to hide one or more regions of the image. The jitter addition operation may correspond to addition of additional horizontal lines in the corresponding image. In some embodiments, the second subset of image transformations may include the first subset of image transformations.

The input batch 312 may include a first unlabeled image 312A, a second unlabeled image 312B, and a labeled image 312C. The first unlabeled image 312A may be associated with a second data augmentation type (i.e., a strong data augmentation). Whereas the second unlabeled image 312B and the labeled image 312C may be associated with the first data augmentation type (i.e., a weak data augmentation). Specifically, the first unlabeled image 312A may be generated based on application of at least one operation of the first subset of image transformations on the unlabeled image 310. The second unlabeled image 312B may be generated based on the application of at least one operation of the second subset of image transformations on the unlabeled image 310. Similarly, the labeled image 312C may be generated based on application of at least one operation of the first subset of image transformations on the labeled image 308. As shown, for example, the first unlabeled image 312A and the labelled image 312C may be generated by application of an image flipping operation on the unlabeled image 310 and the labelled image 308 respectively. The second unlabeled image 312B may be generated by application of an image flipping operation as well as a masking operation on certain parts of the unlabeled image 310.

Upon generation of the input batch 312, the system 102 may be configured to apply the teacher neural network 304 on each image of the input batch 312. As discussed, the teacher neural network 304 may be pretrained network for an object detection task. Based on the application of the teacher neural network 304 on each image of the input batch 312, the system 102 may generate a first result for each input. The first result for the object (i.e., players) in the first unlabeled image 312A of the input batch 312 may include a set of candidate bounding boxes for the object (and/or other foreground or background objects) and a set of scores corresponding to the set of candidate bounding boxes. Similarly, the first result for the object (i.e., players) in the second unlabeled image 312B of the input batch 312 may include a first set of candidate bounding boxes for the object (and/or other foreground or background objects) and a first set of scores corresponding to the first set of candidate bounding boxes. Also, the first result for the object (i.e., the animal 308A) in the third labelled image 312C of the input batch 312 may include a second set of candidate bounding boxes for the object (and/or other foreground or background objects) and a second set of scores corresponding to the second set of candidate bounding boxes.

In an embodiment, the set of candidate bounding boxes may include foreground bounding boxes and background bounding boxes. The foreground bounding boxes may be treated as predictions of regions of interest (ROIs) that include at least a portion of the object or the whole object (i.e., object of interest) of the first unlabeled image 312A. Whereas, the background bounding boxes may be treated as predictions of ROIs that include background objects (i.e., object(s) that are not to be considered for object detection) of the first unlabeled image 312A. Similar to the set of candidate bounding boxes, the set of scores may include foreground scores for foreground bounding boxes of the set of candidate bounding boxes, and background scores for background bounding boxes of the set of candidate bounding boxes. The set of scores may correspond to confidence scores, each of which may indicate a probability of having the object inside a corresponding bounding box. For example, a foreground score may correspond to a probability that a corresponding foreground bounding box includes the object and a background score may correspond to a probability that a corresponding background bounding box includes the object of the first unlabeled image 312A.

In an embodiment, the system 102 may be further configured to provide the generated set of candidate bounding boxes for the object and the set of scores corresponding to the set of candidate bounding boxes to a first label generator 314. The first label generator 314 may include a non-maximum suppression (NMS) operation and an adaptive threshold filter.

To eliminate one or more redundant bounding boxes from the set of candidate bounding boxes, the NMS operation may be applied. Thus, the system 102 may apply the NMS operation on the set of candidate bounding boxes to extract a subset of candidate bounding boxes from the set of candidate bounding boxes.

To apply the adaptive threshold filter after the application of the NMS operation, a threshold must be determined for each input image to the teacher neural network 108 so as to filter out bounding boxes that are not part of the foreground. Therefore, the system 102 may determine a threshold score based on the set of scores included in the first result. For the threshold score, the system 102 may compute an average foreground score and an average background score. The average foreground score may be computed by dividing a sum of the foreground scores by a number of the foreground bounding boxes. Similarly, the average background score may be computed by dividing a sum of the background scores by a number of the background bounding boxes. Thereafter, the system 102 may divide the average foreground score by the average background score to produce a value. A floor function may be applied on the produced value to determine the threshold score. As an example, the threshold score may be mathematically represented using equation (1), which is given as follows:

$$T_a = \left\lfloor \left( \frac{\frac{1}{N_b^{fg}} \sum_{i=1}^{N_b^{fg}} S_i^{fg}}{\frac{1}{N_b^{bg}} \sum_{j=1}^{N_b^{bg}} S_j^{bg}} \right)^\gamma \right\rfloor \quad (1)$$

where,
$\tau_a$ represents the threshold score,
$N_b^{fg}$ represents the number of the foreground bounding boxes,
$N_b^{bg}$ represents the number of the background bounding boxes,
$S_i^{fg}$ represents sum of the foreground scores,
$S_i^{bg}$ represents sum of the background scores, and
$\gamma$ represents a degree of underrepresented classes (or labelled images) and $\gamma=0.95$.

After the determination of the threshold score, the system 102 may apply the adaptive threshold filter. In accordance with an embodiment, the adaptive threshold filter may be applied after the application of the non-maximum suppression operation. The application of the adaptive threshold filter may include an operation to compare the score associated with each of the subset of candidate bounding boxes with the determined threshold score. In case the score is greater than the adaptive threshold, then a corresponding bounding box may be included in a first subset of candidate bounding boxes. Otherwise, the corresponding bounding box may be eliminated or discarded from and may not be included in the first subset of candidate bounding boxes. In some embodiments, the first subset of candidate bounding boxes may be referred to as pseudo bounding boxes.

It should be noted that the adaptive threshold filter may be introduced to help the teacher-student framework 302 to retain better pseudo bounding boxes. Such pseudo bounding boxes may be further used with the classification loss function.

The system 102 may be further configured to select a foreground bounding box. The foreground bounding box may be selected from the extracted first subset of candidate bounding boxes. In an embodiment, the selected bounding box may have a maximum score among all the candidate bounding boxes of the first subset of candidate bounding boxes. Specifically, the foreground bounding box may include a maximum portion or whole object among all other bounding boxes of the first subset of candidate bounding boxes. The foreground bounding box may be used as a ground truth for the set of foreground bounding boxes generated by the student neural network 110. Such a foreground bounding box may be used in calculation of the training loss on which the student neural network 110 has to be trained.

To select a foreground bounding box for the second unlabeled image 312B, the system 102 may apply a second label generator 316 on the first result associated with the second unlabeled image 312B. The first label generator 314 may include a jitter bagging module and an adaptive threshold filter. The jitter bagging module, when executed by the system 102, may apply a jitter operation on the selected bounding box for a number of iterations to generate a set of jitter boxes. The jitter operation may be applied on the selected bounding box to obtain a refined bounding box. As an example, the refined bounding box may be mathematically represented using an equation (2), which is given as follows:

$$\hat{b}_i = f_{jitter}(b_i) \quad (2)$$

where, $\hat{b}_i$ represents the refined bounding box,
$b_i$ represents the selected bounding boxes, and
$f_{jitter}$ represents the jitter operation.

The system 102 may execute a bagging operation on the set of jitter boxes. Specifically, the bagging operation may be executed as part of the execution of the jitter bagging module of the second label generator 316. The bagging operation may be executed to select a jitter box with an area that is a maximum among respective areas of the set of jitter boxes. As an example, the selected jitter box may be mathematically represented using an equation (3), which is given as follows:

$$b_i^{fg} = f_{bagging}(\hat{b}_i) \quad (3)$$

where, $b_i^{fg}$ represents the selected jitter box,
$\hat{b}_i$ represents the refined bounding box, and
$f_{bagging}$ represents the bagging operation.

The system 102 may further apply an adaptive threshold filter on the selected jitter box to select a foreground bounding box. The selected jitter box may be used in computing a box-regression loss that may be part of the training loss over the input batch 312. Details about the adaptive threshold filter are provided above. It should be noted that the threshold score associated with the adaptive threshold filter of the second label generator 316 may be different from the threshold score associated with the adaptive threshold filter of the first label generator 314 because the second label generator 316 may be associated with the second unlabeled image 312B whereas the first label generator 314 is associated with the first unlabeled image 312A.

In order to train the student neural network 306, image(s) from the input batch 312 may be fed to the student neural network one at a time and respective loss may be computed. In accordance with an embodiment, the system 102 may be configured to generate a second result. The generated second result may include a bounding box prediction for the object and may be generated by an application of the student neural network 306 on the first unlabeled image 312A. As discussed earlier, the student neural network 306 may be an untrained network that may have to be trained for the object detection task. Similar to the generation of the second result, the system 102 may also generate a third result by an application of the student neural network 306 on the labeled image 312C of the input batch 312.

The system 102 may compute a total supervised loss 318 for the first result associated with the labeled image 312C and the third result associated with the labeled image 312C, by using a supervised loss function and a supervised regression loss function. In an embodiment, the total supervised loss 318 includes a supervised classification loss and a supervised box-regression loss. The supervised classification loss may be associated with the supervised loss function and the supervised box-regression loss may be associated with the supervised box-regression loss. As an example, the total supervised loss 318 for the first result and the third result may be mathematically represented using an equation (4), which is given as follows:

$$L_{sup} = \frac{1}{N_l} \sum_{i=1}^{N_l} \left( L_{sup}^{cls}(I_i^l) + L_{sup}^{reg}(I_i^l) \right) \quad (4)$$

where, $L_{sup}$ represents the total supervised loss,
$L_{sup}^{cls}$ represents the supervised loss function,
$L_{sup}^{reg}$ represents the supervised regression loss function,
$N_l$ represents a number of labelled images,
$S_i^{bg}$ represents sum of the background scores, and
$I_i^l$ represents ith labelled image.

In an embodiment, the system 102 may compute a first unsupervised loss 320 for the first result (i.e., generated for the first unlabeled image 312A of the input batch 312). Also, the system 102 may compute a second unsupervised loss 322 for the first result (i.e., generated for the second unlabeled image 312B of the input batch 312). Each of the first unsupervised loss 320 and the second unsupervised loss 322 may be computed by using an unsupervised loss function. Also, each of the first unsupervised loss 320 and the second unsupervised loss 322 may include an unsupervised classification loss and an unsupervised box-regression loss. In case of the first unsupervised loss 320, the unsupervised box-regression loss may be generated after the application of the second label generator 316 on the first result (generated for the first unlabeled image 312A of the input batch 312). As an example, the first unsupervised loss 320 may be mathematically represented using an equation (5), which is given as follows:

$$L_{unsup}^{wa} = \frac{1}{N_u} \sum_{i=1}^{N_u} \left( L_{unsup}^{cls}(I_{u,i}^{wa}) + L_{unsup}^{reg}(I_{u,i}^{wa}) \right) \quad (5)$$

where, $L_{unsup}^{wa}$ represents the first unsupervised loss 320,
$L_{unsup}^{cls}$ represents the unsupervised classification loss function,
$L_{unsup}^{reg}$ represents the unsupervised box-regression loss function,
$N_u$ represents a number of unlabeled images,
$S_i^{bg}$ represents sum of the background scores, and
$I_{u,i}^{wa}$ represents ith weakly augmented unlabeled image.

In case of the second unsupervised loss 322, the unsupervised box-regression loss may be generated after the application of the second label generator 316 on the first result (generated for the second unlabeled image 312B of the input batch 312). As an example, the second unsupervised loss 322 may be mathematically represented using an equation (6), which is given as follows:

$$L_{unsup}^{sa} = \frac{1}{N_u} \sum_{i=1}^{N_u} \left( L_{unsup}^{cls}(I_{u,i}^{sa}) + L_{unsup}^{reg}(I_{u,i}^{sa}) \right) \quad (6)$$

where, $L_{unsup}^{sa}$ represents the second unsupervised loss 322,
$L_{unsup}^{cls}$ represents the unsupervised classification loss function, $L_{unsup}^{reg}$ represents the unsupervised box-regression loss function, $N_u$ represents a number of unlabeled images, and $I_{u,i}^{sa}$ represents ith strongly augmented unlabeled image.

In an embodiment, the unsupervised classification loss function used in each of the first unsupervised loss 320 and the second unsupervised loss 322 may be equal to a sum of a foreground classification loss, a background classification loss, a background similarity loss, and a foreground-background dissimilarity loss. As an example, the unsupervised classification loss function may be mathematically represented using an equation (7), which is given as follows:

$$L_{unsup}^{cls} = L_{fg}^{cls} + L_{bg}^{cls} + L_{bg}^{sim} + L_{fg\text{-}bg}^{dissim} \quad (7)$$

where, $L_{unsup}^{cls}$ represents the first unsupervised classification loss, $L_{fg}^{cls}$ represents the foreground classification loss function, $L_{bg}^{cls}$ represents the background classification loss function, $L_{bg}^{sim}$ represents the background similarity loss function, and $L_{fg\text{-}bg}^{dissim}$ represents the foreground-background dissimilarity loss function.

The foreground classification loss may help the teacher-student framework 302 to classify the foreground bounding boxes (i.e., $b^{fg}$) generated by the application of the student neural network 306 on the input batch 312 from the foreground bounding boxes generated by the teacher neural network 304 on the input batch 312. Specifically, the foreground classification loss may be associated with the second unlabeled image 312B of the input batch 312. As an example, the foreground classification loss may be mathematically represented using an equation (8), which is given as follows:

$$L_{fg}^{cls} = \frac{1}{N_b^{fg}} \sum_{i=1}^{N_b^{fg}} l_{cls}(b_i^{fg}(s), \beta_{cls}) \quad (8)$$

where, $L_{fg}^{cls}$ represents the foreground classification loss, $N_b^{fg}$ represents the number of the foreground bounding boxes generated by the student neural network 306, $l_{cls}$ represents a box classification loss, $b_i^{fg}$ represents the ith foreground bounding box, and $\beta_{cls}$ represents the set of candidate bounding boxes for the object.

The background classification loss may indicate a reliability of each bounding box candidate generated by the student neural network 306. As an example, the background classification loss may be mathematically represented using an equation (9), which is given as follows:

$$L_{bg}^{cls} = \sum_{j=1}^{N_b^{bg}} \delta_j l_{cls}(b_j^{bg}(s), \beta_{cls}) \quad (9)$$

where, $L_{bg}^{cls}$ represents the background classification loss, $N_b^{bg}$ represents a number of background bounding boxes generated by the student neural network 306, $l_{cls}$ represents a standard cross-entropy loss (or a box classification loss), $b_j^{bg}$ represents the jth background bounding box, $\beta_{cls}$ represents the set of candidate bounding boxes for the object, and $\delta_j$ represents a reliability weighting factor associated with jth background bounding box.

In an embodiment, the circuitry 104 may be configured to calculate the reliability weighting factor. The reliability weighting factor may be based on a reliability score that may be associated with jth background bounding box being the background bounding box. As an example, the reliability weighting factor may be mathematically represented using an equation (10), which is given as follows:

$$\delta_j = \frac{r_j}{\sum_{k=1}^{N_b^{bg}} r_k} \quad (10)$$

where, $\delta_j$ represents the reliability weighting factor, $N_b^{bg}$ represents a number of background bounding boxes generated by the student neural network 306, $r_j$ represents the reliability score for the jth background bounding box, and $b_j^{bg}$ represents the jth background bounding box.

The background similarity loss may be used to match the set of background scores generated by the teacher neural network 304 and the set of background scores generated by the student neural network 306). Such a loss may have to be minimized to ensure that the set of bounding boxes generated by the teacher neural network 304 is similar to that generated by the student neural network 306. As an example, the background similarity loss may be mathematically represented using an equation (11), which is given as follows:

$$L_b^{sim} = \frac{1}{N_b^{bg}} \sum_{i=1}^{N_b^{bg}} \beta \cdot \log\left(|e^{|S_i^{bg}(s)|} - e^{|S_i^{bg}(t)|}| + 1\right) \quad (11)$$

where, $L_b^{sim}$ represents the background similarity loss, $N_b^{bg}$ represents a number background bounding boxes generated by the student neural network 306, $\beta$ represents a controlling parameter, $S_i^{bg}(t)$ represents the ith score obtained from background bounding box generated using the teacher neural network 304, and $S_i^{bg}(s)$ represents the ith score obtained from background bounding box generated using the student neural network 306.

The foreground-background dissimilarity loss may be used to separate out the foreground and background bounding boxes generated using the student neural network 306. In an embodiment, the foreground-background dissimilarity loss may follow a principle of relativistic average discriminator loss function, which is used to match two different probability distribution. The foreground-background dissimilarity loss may provide a dissimilarity between background scored and foreground scores associated with the background bounding boxes and foreground bounding boxes (generated by the student neural network 306). As an example, the foreground-background dissimilarity loss may be mathematically represented using an equation (12), which is given as follows:

$$L_{fg-bg}^{dissim} = \frac{1}{N_b^{fg}} \sum_{i=1}^{N_b^{fg}} \left( 1 - |S_i^{fg}(s) - \frac{1}{N_b^{bg}} \sum_{j=1}^{N_b^{bg}} S_j^{bg}(s)| \right) \quad (12)$$

where, $L_{fg-bg}^{dissim}$ represents the foreground-background dissimilarity loss, $N_b^{bg}$ represents a number of candidate bounding boxes for a set of background bounding boxes generated by the student neural network 306, $N_b^{fg}$ represents a number of candidate bounding boxes for a set of foreground bounding boxes generated by the student neural network 306, β represents a controlling parameter, $S_i^{fg}(s)$ represents the ith score obtained from foreground bounding box generated using the student neural network 306, and $S_i^{bg}(s)$ represents the jth score obtained from background bounding box generated using the student neural network 306.

As discussed earlier, the first unsupervised loss and the second unsupervised loss include the unsupervised box-regression loss. The unsupervised box-regression loss may provide an error between a predicted and a pseudo bounding box. As an example, the unsupervised box-regression loss may be mathematically represented using an equation (13), which is given as follows:

$$L_{unsup}^{reg} = \frac{1}{N_b^{fg}} \sum_{i=1}^{N_b^{fg}} l_{reg}(b_i^{fg}, \beta_{reg}) \quad (13)$$

where, $L_{unsup}^{reg}$ represents the unsupervised box-regression loss, $N_b^{fg}$ represents a number of candidate bounding boxes for a set of foreground bounding boxes generated by the student neural network 306, $\beta_{reg}$ represents the bounding box, $b_i^{fg}$ represents the ith bounding box that may be assigned as a foreground bounding box or represents the selected jitter box represented via equation (3), and $l_{reg}$ represents a mean absolute error loss or a box regression loss.

After computing individual losses, the system 102 may compute a training loss 324 over the input batch 312. In an embodiment, the training loss 324 may be computed based on the foreground bounding box and the bounding box prediction. In another embodiment, the training loss 324 may be computed based on the computation of the total supervised loss 318 for the labeled image 312C of the input batch. In another embodiment, the training loss 324 may be computed based on the computation of the first unsupervised loss and the second unsupervised loss. Mathematically, the computed training loss 324 may be represented using an equation (14), which is given as follows:

$$L_{Total} = L_{sup} + \alpha \cdot (L_{unsup}^{wa} + L_{unsup}^{sa}) \quad (14)$$

where, $L_{Total}$ represents the computed training loss 324, $L_{sup}$ represents the total supervised loss 318 represented by equation (4), $L_{unsup}^{wa}$ represents first unsupervised loss 320 represented by equation (5), $L_{unsup}^{sa}$ represents second unsupervised loss 322 represented by equation (6), and α represent a value that controls a contribution of the unsupervised loss in the computed training loss 324.

The system 102 may be configured to train the student neural network 306 on the object detection task based on the computed training loss 324. Specifically, the computed training loss 324 may be used in a backpropagation operation to update weights parameters of the student neural network 306. To train (or re-train) the student neural network 306, the system 102 may update weight parameters of the student neural network 306 using the computed training loss 324.

Based on the updated weight parameters of the student neural network 306, the system 102 may update weight parameters of the teacher neural network 304. In an embodiment, the update of the weight parameters of the teacher neural network 304 may include execution of an exponential moving average (EMA) operation. The EMA operation may be a type of moving average function that may apply more weight to most recent data points than those that older datapoints. Mathematically, the exponential moving average (EMA) may be represented by using an equation (15), which is given as follows:

$$w(t)_{ts} = \alpha w(t)_{ts-1} + (1-\alpha) w(s)_{ts} \quad (15)$$

where, $w(t)_{ts}$ represents the weights of the teacher neural network 304 at current timestamp $t_s$, $w(s)_{ts}$ represents the weights of the student neural network 306 at current timestamp $t_s$, and α represents a controlling parameter (e.g., α=0.99).

To enhance the update efficiency, the system 102 may also execute an Exponential Adaptive Difference Moving Average (E-ADMA) operation. The E-ADMA operation may be referred to via a regularization term that may be added to regularize the update of the weights of the teacher neural network 304. Mathematically, the Exponential Adaptive Difference Moving Average (E-ADMA) may be represented by using an equation (16), which is given as follows:

$$w(t)_{ts} = \alpha w(t)_{ts-1} + (1-\alpha) w(s)_{ts} + \alpha(1-\alpha) |w(s)_{ts} - w(t)_{ts-1}| \quad (16)$$

where, $w(t)_{ts}$ represents the weights of the teacher neural network 304 at current timestamp $t_s$, $w(s)_{ts}$ represents the weights of the student neural network 306 at current timestamp $t_s$, and α represents a controlling parameter (e.g., α=0.99).

It should be noted that initially the teacher neural network 304 may be updated via the EMA operation and it may be finetuned based on the execution of the E-ADMA operation at every jth iteration. This may be done so that the teacher neural network 304 becomes more resilient to the sudden weight turbulence of the student neural network 306 due to a wrong label prediction of the teacher neural network 304. Even if the student neural network 306 is fed with a wrong label, its influence on the teacher neural network 304 is mitigated by the above-mentioned update mechanism provided by equations (15) and (16). The process of updating the weights may be performed iteratively until the student neural network 306 is trained for the object detection task. Specifically, the system 102 may be configured to iteratively train the student neural network 306 on the object detection task based on the training loss 324 (or until the training loss 324 over the batch is a minimum or below a threshold).

Figure 4:
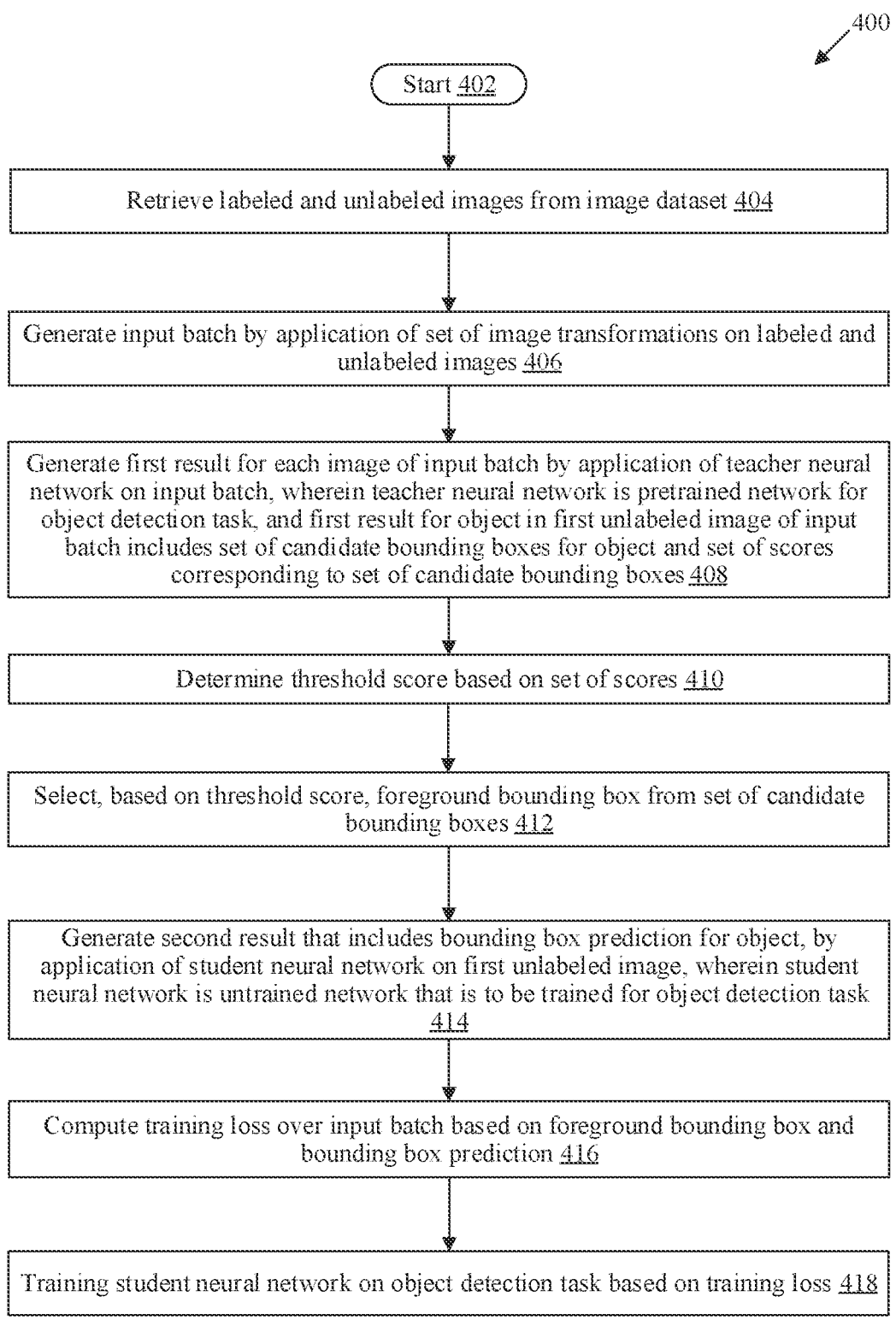
FIG. 4 is a flowchart that illustrates an exemplary method of teaching student network for end-to-end semi-supervised object detection, in accordance with an embodiment of the disclosure.

FIG. 4 is a flowchart that illustrates an exemplary method of teaching student network for end-to-end semi-supervised object detection, in accordance with an embodiment of the disclosure. FIG. 4 is explained in conjunction with elements from FIG. 1, FIG. 2, and FIG. 3. With reference to FIG. 4, there is shown a flowchart 400. The operations of the flowchart 400 may start at 402 and may proceed to 404.

At 404, the labeled images 308 and the unlabeled images 310 may be retrieved from the image dataset 118. In at least one embodiment, the circuitry 104 may be configured to retrieve the labeled image 308 and the unlabeled images 310 from the image dataset 118. Details about the retrieval of the labeled and unlabeled images are provided, for example, in FIG. 1, and FIG. 3.

At 406, the input batch 312 may be generated by an application of the set of image transformations on the labeled image 308 and the unlabeled images 310. In at least one embodiment, the circuitry 104 may be configured to generate the input batch 312 by an application of the set of image transformations on the labeled image 308 and the unlabeled images 310. Details about the generation of the input batch 120 are provided, for example, in FIG. 3.

At 408, the first result for each image of the input batch 312 may be generated by an application of the teacher neural network 304 on the input batch 312. The teacher neural network 304 may be a pretrained network for an object detection task. The first result for an object in the first unlabeled image 312A of the input batch 312 may include a set of candidate bounding boxes for the object and a set of scores corresponding to the set of candidate bounding boxes. In at least one embodiment, the circuitry 104 may be configured to generate the first result for each image of the input batch 312 by an application of the teacher neural network 304 on the input batch 312, wherein the teacher neural network 304 is a pretrained network for the object detection task, and wherein the first result for an object in the first unlabeled image 312A of the input batch 312 includes the set of candidate bounding boxes for the object and the set of scores corresponding to the set of candidate bounding boxes. Details about generation of the first result are provided, for example, in FIG. 3.

At 410, the threshold score may be determined based on the set of scores. In at least one embodiment, the circuitry 104 may be configured to determine the threshold score based on the set of scores. Details about the determination of the threshold score are provided, for example, in FIG. 3.

At 412, the foreground bounding box may be selected from the set of candidate bounding boxes based on the threshold score. In at least one embodiment, the circuitry 104 may be configured to select the foreground bounding box from the set of candidate bounding boxes based on the threshold score. Details about the selection of the foreground bounding box are provided, for example, in FIG. 3.

At 414, the second result that includes a bounding box prediction for the object may be generated by an application of the student neural network 306 on the first unlabeled image 312A. The student neural network 306 may be an untrained network that is to be trained for the object detection task. In at least one embodiment, the circuitry 104 may be configured to generate the second result that includes the bounding box prediction for the object by an application of the student neural network 306 on the first unlabeled image 312A, wherein the student neural network 110 may be an untrained network that is to be trained for the object detection task. Details about the student neural network 306 are provided, for example, in FIG. 3.

At 416, the training loss 324 may be computed over the input batch 312 based on the foreground bounding box and the bounding box prediction. In at least one embodiment, the circuitry 104 may be configured to compute the training loss 324 over the input batch 312 based on the foreground bounding box and the bounding box prediction. Details about the computation of the training loss 324 are provided, for example, in FIG. 3.

At 418, the student neural network 306 may be re-trained on the object detection task based on the training loss 324. In at least one embodiment, the circuitry 104 may be configured to re-train the student neural network 306 on the object detection task based on the training loss 324. Control may pass to end.

Based on experimental data obtained after performing several experiments during the time of drafting this patent application, the disclosed student-teacher framework outperformed the state-of-the-art semi-supervised object detection methods with a large margin (i.e., improvement in terms of mean average precision) when executed on known datasets such as a Microsoft® COCO dataset.

Various embodiments of the disclosure may provide a non-transitory computer-readable medium having stored thereon, computer-executable instructions executable by circuitry or a machine to operate a system (e.g., the system 102) for teaching student network for end-to-end semi-supervised object detection. The computer-executable instructions may cause the machine and/or computer to perform operations that include retrieving labeled and unlabeled images from an image dataset (e.g., the image dataset 118). The operations may further include generating an input batch (e.g., the input batch 312) by an application of a set of image transformations on the labeled and unlabeled images. The operations may further include generating a first result for each image of the input batch by an application of a teacher neural network (e.g., the teacher neural network 108) on the input batch. The teacher neural network may be a pretrained network for an object detection task and the first result for an object in a first unlabeled image (e.g., the first unlabeled image 312A) of the input batch includes a set of candidate bounding boxes for the object and a set of scores corresponding to the set of candidate bounding boxes. The operations may further include determining a threshold score based on the set of scores. The operations may further include selecting a foreground bounding box from the set of candidate bounding boxes based on the threshold score. The operations may further include generating a second result that includes a bounding box prediction for the object by an application of a student neural network (e.g., the student neural network 110) on the first unlabeled image. The student neural network may be an untrained network that is to be trained for the object detection task. The operations may further include computing a training loss (e.g., the student neural network 306) over the input batch based on the foreground bounding box and the bounding box prediction and training the student neural network on the object detection task based on the training loss.

Certain embodiments of the disclosure may be found in a system and a method for teaching student network for end-to-end semi-supervised object detection. Various embodiments of the disclosure may provide the system 102 that may include the circuitry 104 and memory 106. The circuitry 104 may be configured to retrieve the labeled image 308 and the unlabeled images 310 from the image dataset 118. The circuitry 104 may be further configured to randomly sample the image dataset 118 using a sample ratio to retrieve the labeled image 308 and the unlabeled images 310. The circuitry 104 may be further configured to generate the input batch 312 by an application of a set of image transformations on the labeled image 308 and the unlabeled images 310. The set of image transformations may include a first subset of image transformations associated with a first data augmentation type and a second subset of image transformations associated with a second data augmentation type that may be different from the first data augmentation type.

In accordance with an embodiment, the first subset of image transformations may include an image flipping operation and an image shifting operation, and the second subset of image transformations may include one or more of an image rotation operation, a blur operation, a contrast variation, a shear operation, a masking operation for one or more regions of an image, a jitter addition operation, or an addition of a random noise.

In accordance with an embodiment, the generated input batch 312 may include the first unlabeled image 312A, the second unlabeled image 312B, and the labeled image 312C. The first unlabeled image 312A and the labeled image 312C may be associated with the first data augmentation type. The second unlabeled image 312B may be associated with the first data augmentation type.

In accordance with an embodiment, the circuitry 104 may be configured to generate a first result for each image of the input batch 312 by an application of a teacher neural network 304 on the input batch 312. The teacher neural network 304 may be a pretrained network for an object detection task and the first result for an object in a first unlabeled image 312A of the input batch 312 may include a set of candidate bounding boxes for the object and a set of scores corresponding to the set of candidate bounding boxes. The set of scores corresponding to the set of candidate bounding boxes may include foreground scores for foreground bounding boxes of the set of candidate bounding boxes and background scores for background bounding boxes of the set of candidate bounding boxes.

In accordance with an embodiment, the circuitry 104 may be further configured to determine a threshold score based on the set of scores. In an embodiment, the circuitry 104 may be configured to compute an average foreground score by dividing a sum of the foreground scores by a number of the foreground bounding boxes. The circuitry 104 may be further configured to computing an average background score by dividing a sum of the background scores by a number of the background bounding boxes. In an embodiment, the threshold score may be determined by divide the average foreground score by the average background score to produce a value and applying a floor function on the value.

In accordance with an embodiment, the circuitry 104 may be further configured to apply a non-maximum suppression operation on the set of candidate bounding boxes to extract a subset of candidate bounding boxes from the set of candidate bounding boxes. The circuitry 104 may further select a foreground bounding box from the subset of candidate bounding boxes.

In accordance with an embodiment, the circuitry 104 may be configured to select a bounding box from the subset of candidate bounding boxes. The circuitry 104 may further apply a jitter operation on the selected bounding box for a number of iterations to generate a set of jitter boxes. The circuitry 104 may further execute a bagging operation on the set of jitter boxes to select a jitter box with an area that is a maximum among respective areas of the set of jitter boxes.

In accordance with an embodiment, the circuitry 104 may be further configured to compute the first unsupervised loss 320 for the first result that may be generated for the first unlabeled image 312A. The circuitry 104 may be further configured to compute the second unsupervised loss 322 for the first result that may be generated for the second unlabeled image 312B of the input batch 312. Each of the first unsupervised loss and the second unsupervised loss is computed by using an unsupervised loss function and includes an unsupervised classification loss and an unsupervised box-regression loss.

In accordance with an embodiment, the circuitry 104 may generate a second result that includes a bounding box prediction for the object. The second result may be generated by an application of the student neural network 306 on the first unlabeled image 312A. The student neural network 306 may be an untrained network that is to be trained for the object detection task.

In accordance with an embodiment, the circuitry 104 may be further configured to generate a third result by an application of the student neural network 306 on the labeled image 312C of the input batch 312. The circuitry 104 may be further configured to compute a total supervised loss for the first result associated with the labeled image 312C and the third result associated with the labeled image 312C, by using a supervised loss function and a supervised regression loss function. The total supervised loss includes a supervised classification loss and a supervised box-regression loss. The circuitry 104 may be further configured to compute the training loss 324 over the input batch 312 based on the foreground bounding box and the bounding box prediction. In another embodiment, the circuitry 104 may be further configured to compute the training loss based on the computation of the total supervised loss for the labeled image 312C of the input batch 312. In another embodiment, the training loss 324 is computed further based on the computation of the first unsupervised loss 320 and the second unsupervised loss 322. In another embodiment, the training loss 324 is computed further based on the selected jitter box used in computing a box-regression loss that is part of the training loss.

In accordance with an embodiment, the circuitry 104 may be further configured to train the student neural network 306 on the object detection task based on the training loss. In an embodiment, the circuitry 104 may be further configured to update weight parameters of the student neural network 306 using the training loss to train the student neural network 306. In another embodiment, the circuitry 104 may be further configured to update weight parameters of the teacher neural network 304 based on the updated weight parameters of the student neural network 306.

In accordance with an embodiment, the update of the weight parameters of the teacher neural network 304 includes an execution of an exponential moving average (EMA) operation and an execution of an Exponential Adaptive Difference Moving Average (E-ADMA) operation.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that includes a portion of an integrated circuit that also performs other functions.

The present disclosure may also be embedded in a computer program product, which includes all the features that enable the implementation of the methods described herein, and which, when loaded in a computer system, is able to carry out these methods. Computer program, in the present context, means any expression, in any language, code or notation, of a set of instructions intended to cause a system with an information processing capability to perform a particular function either directly, or after either or both of the following: a) conversion to another language, code or notation; b) reproduction in a different material form.

While the present disclosure has been described with reference to certain embodiments, it will be understood by those skilled in the art that various changes may be made, and equivalents may be substituted without deviation from the scope of the present disclosure. In addition, many modifications may be made to adapt a particular situation or material to the teachings of the present disclosure without deviation from its scope. Therefore, it is intended that the present disclosure is not limited to the particular embodiment disclosed, but that the present disclosure will include all embodiments falling within the scope of the appended claims.

What is claimed is:

1. A method, comprising:
   retrieving labeled and unlabeled images from an image dataset;
   generating an input batch by an application of a set of image transformations on the labeled and unlabeled images;
   generating a first result for each image of the input batch by an application of a teacher neural network on the input batch,
      wherein the teacher neural network is a pretrained network for an object detection task, and
      the first result for an object in a first unlabeled image of the input batch includes a set of candidate bounding boxes for the object and a set of scores corresponding to the set of candidate bounding boxes;
   determining a threshold score based on the set of scores;
   selecting, based on the threshold score, a foreground bounding box from the set of candidate bounding boxes;
   generating a second result that includes a bounding box prediction for the object, by an application of a student neural network on the first unlabeled image,
      wherein the student neural network is an untrained network that is to be trained for the object detection task;
   computing a training loss over the input batch based on the foreground bounding box and the bounding box prediction; and
   re-training the student neural network on the object detection task based on the training loss.

2. The method according to claim 1, further comprising randomly sampling the image dataset using a sample ratio to retrieve the labeled and unlabeled images.

3. The method according to claim 1, wherein the set of image transformations comprises a first subset of image transformations associated with a first data augmentation type and a second subset of image transformations associated with a second data augmentation type that is different from the first data augmentation type.

4. The method according to claim 3, wherein the first subset of image transformations comprises an image flipping operation and an image shifting operation, and the second subset of image transformations comprises one or more of an image rotation operation, a blur operation, a contrast variation, a shear operation, a masking operation for one or more regions of an image, a jitter addition operation, or an addition of a random noise.

5. The method according to claim 3, wherein the input batch comprises a second unlabeled image and a labeled image associated with the first data augmentation type, and the first unlabeled image is associated with the second data augmentation type.

6. The method according to claim 1, further comprising:
   generating a third result by the application of the student neural network on a labeled image of the input batch; and
   computing a total supervised loss for the first result associated with the labeled image and the third result associated with the labeled image, by using a supervised loss function and a supervised regression loss function,
      wherein the total supervised loss includes a supervised classification loss and a supervised box-regression loss, and
      the training loss is computed further based on the computation of the total supervised loss for the labeled image of the input batch.

7. The method according to claim 1, further comprising:
   computing a first unsupervised loss for the first result that is generated for the first unlabeled image;
   computing a second unsupervised loss for the first result that is generated for a second unlabeled image of the input batch,
      wherein each of the first unsupervised loss and the second unsupervised loss is computed by using an unsupervised loss function and includes an unsupervised classification loss and an unsupervised box-regression loss, and
      wherein the training loss is computed further based on the computation of the first unsupervised loss and the second unsupervised loss.

8. The method according to claim 7, wherein each of the first unsupervised loss and the second unsupervised loss is equal to a sum of a foreground classification loss, a background classification loss, a background similarity loss, and a foreground-background dissimilarity loss.

9. The method according to claim 1, further comprising an application of a non-maximum suppression operation on the set of candidate bounding boxes to extract a subset of candidate bounding boxes from the set of candidate bounding boxes.

10. The method according to claim 9, wherein the foreground bounding box is selected from the subset of candidate bounding boxes.

11. The method according to claim 9, further comprising:
    selecting a bounding box from the subset of candidate bounding boxes;
    generate a set of jitter boxes by application of a jitter operation on the selected bounding box for a number of iterations; and
    executing a bagging operation on the set of jitter boxes to select a jitter box with an area that is a maximum among respective areas of the set of jitter boxes,
      wherein the selected jitter box is used in computing a box-regression loss that is part of the training loss.

12. The method according to claim 1, wherein the set of scores includes:
    foreground scores for foreground bounding boxes of the set of candidate bounding boxes, and background scores for background bounding boxes of the set of candidate bounding boxes.

13. The method according to claim 12, further comprising:
computing an average foreground score by dividing a sum of the foreground scores by a number of the foreground bounding boxes; and
computing an average background score by dividing a sum of the background scores by a number of the background bounding boxes, wherein the threshold score is determined by:
dividing the average foreground score by the average background score to produce a value; and
applying a floor function on the value.

14. The method according to claim 1, further comprising updating weight parameters of the student neural network using the training loss to re-train the student neural network.

15. The method according to claim 14, further comprising updating weight parameters of the teacher neural network based on the updated weight parameters of the student neural network.

16. The method according to claim 15, wherein the update of the weight parameters of the teacher neural network comprises an execution of an exponential moving average (EMA) operation and an execution of an Exponential Adaptive Difference Moving Average (E-ADMA) operation.

17. A system, comprising:
circuitry configured to:
retrieve labeled and unlabeled images from an image dataset;
generate an input batch by an application of a set of image transformations on the labeled and unlabeled images;
generate a first result for each image of the input batch by an application of a teacher neural network on the input batch,
wherein the teacher neural network is a pretrained network for an object detection task, and
the first result for an object in a first unlabeled image of the input batch includes a set of candidate bounding boxes for the object and a set of scores corresponding to the set of candidate bounding boxes;
determine a threshold score based on the set of scores;
select, based on the threshold score, a foreground bounding box from the set of candidate bounding boxes;
generate a second result that includes a bounding box prediction for the object, by an application of a student neural network on the first unlabeled image,
wherein the student neural network is an untrained network that is to be trained for the object detection task;
compute a training loss over the input batch based on the foreground bounding box and the bounding box prediction; and
re-train the student neural network on the object detection task based on the training loss.

18. The system according to claim 17, wherein the circuitry is further configured to update weight parameters of the student neural network using the training loss to re-train the student neural network.

19. The system according to claim 18, wherein the circuitry is further configured to update weight parameters of the teacher neural network based on the updated weight parameters of the student neural network, and
the update of the weight parameters of the teacher neural network comprises an execution of an exponential moving average (EMA) operation and an execution of an Exponential Adaptive Difference Moving Average (E-ADMA) operation.

20. A non-transitory computer-readable storage medium configured to store instructions that, in response to being executed, causes a computer in a system to perform operations, the operations comprising:
retrieving labeled and unlabeled images from an image dataset;
generating an input batch by an application of a set of image transformations on the labeled and unlabeled images;
generating a first result for each image of the input batch by an application of a teacher neural network on the input batch,
wherein the teacher neural network is a pretrained network for an object detection task, and
the first result for an object in a first unlabeled image of the input batch includes a set of candidate bounding boxes for the object and a set of scores corresponding to the set of candidate bounding boxes;
determining a threshold score based on the set of scores;
selecting, based on the threshold score, a foreground bounding box from the set of candidate bounding boxes;
generating a second result that includes a bounding box prediction for the object, by an application of a student neural network on the first unlabeled image,
wherein the student neural network is an untrained network that is to be trained for the object detection task;
computing a training loss over the input batch based on the foreground bounding box and the bounding box prediction; and
re-training the student neural network on the object detection task based on the training loss.

* * * * *